Oct. 11, 1949.   S. S. MINER   2,484,419
VULCANIZING MECHANISM
Filed June 12, 1945   3 Sheets-Sheet 1
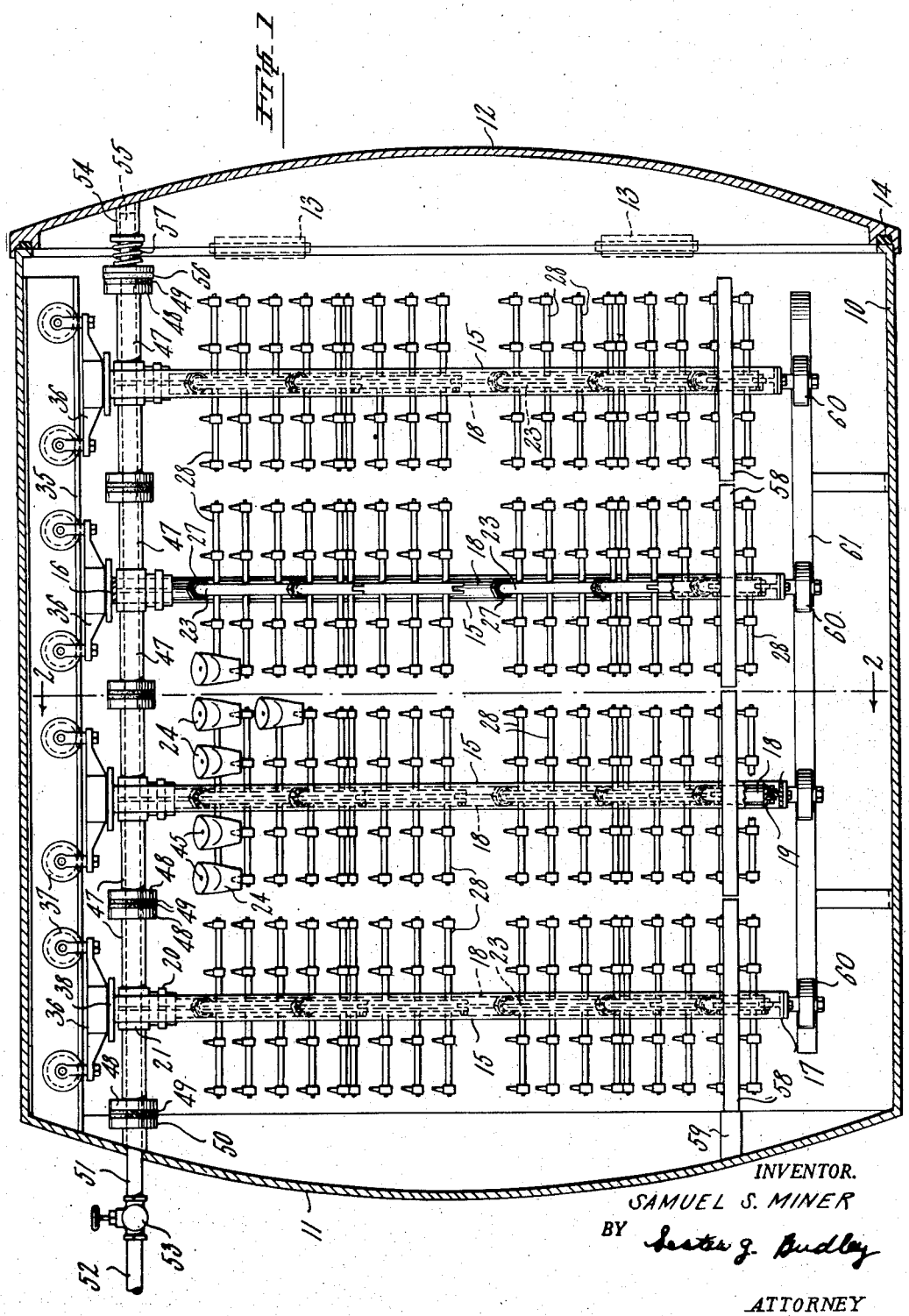
INVENTOR.
SAMUEL S. MINER
BY Lester G. Dudley
ATTORNEY Oct. 11, 1949.   S. S. MINER   2,484,419
VULCANIZING MECHANISM
Filed June 12, 1945   3 Sheets-Sheet 2
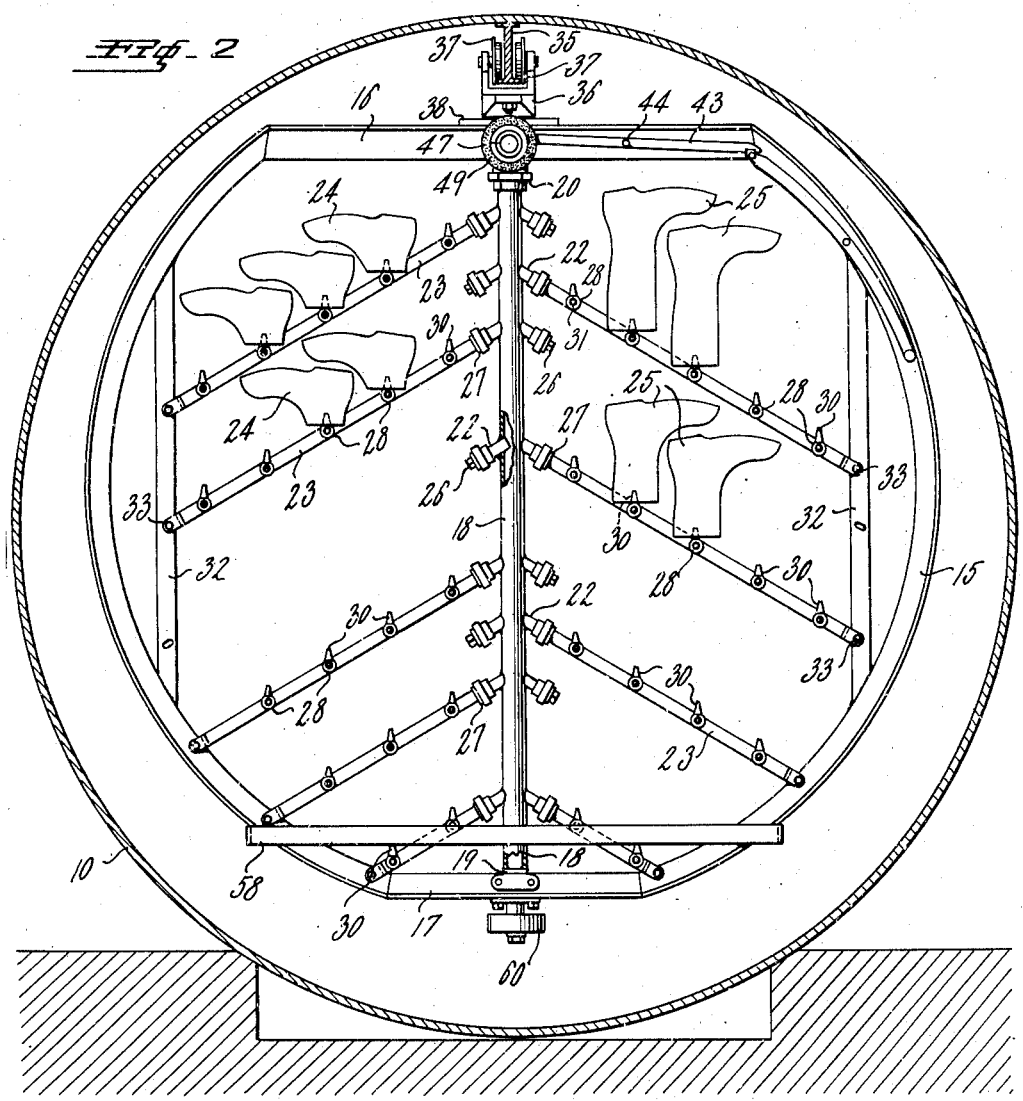
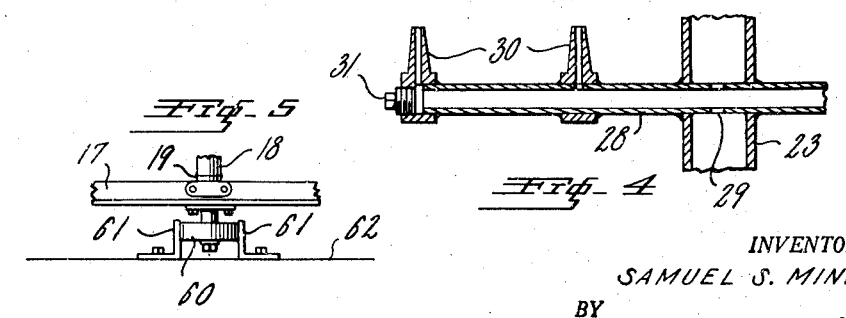
INVENTOR.
SAMUEL S. MINER
BY
Lester J. Budlong
ATTORNEY

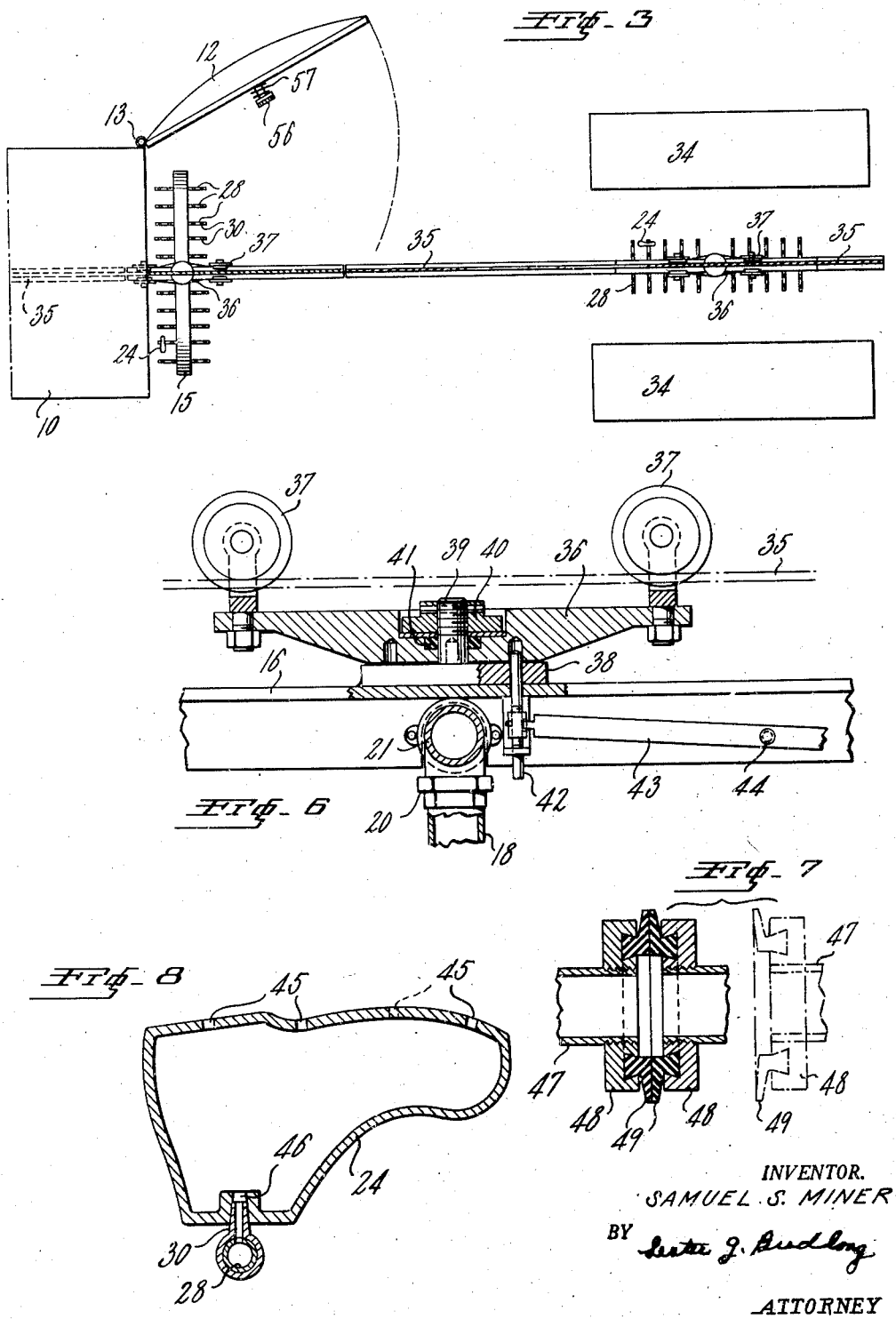

Patented Oct. 11, 1949

2,484,419

UNITED STATES PATENT OFFICE 2,484,419

VULCANIZING MECHANISM

Samuel S. Miner, Mishawaka, Ind., assignor to United States Rubber Company, New York, N. Y., a corporation of New Jersey Application June 12, 1945, Serial No. 599,107

6 Claims. (Cl. 18—6)

This invention relates to vulcanizing mechanism and more particularly to a novel type of frame and carriage for supporting rubber articles while they are being vulcanized.

It has been proposed heretofore to vulcanize footwear or other articles by forming such articles of uncured rubber by building the articles on hollow forms, and then vulcanize these articles while they remain on the forms. It has also been proposed to subject the forms to a suction or vacuum action during the vulcanizing period so as to hold the articles being vulcanized in close conformity with the forms, and draw hot air from the vulcanizing chamber into the forms, during the vulcanizing period.

The usual practice heretofore has been to provide trucks having built thereupon article supporting racks formed of hollow tubing so that air may be exhausted from the racks, and these racks have hollow nipples adapted to receive the forms that carry the articles to be vulcanized. The trucks with the racks thereupon have usually been of rectangular or polygonal shape heretofore, and the forms with the rubber articles thereupon have been mounted on the nipples of the racks and removed therefrom by hand. The trucks when loaded are rolled into a large vulcanizing receptacle, and they are then connected to a vacuum system so that the air may be exhausted from the different vulcanizing frames. The door of the vulcanizing chamber is then closed and the temperature of the interior of the vulcanizer raised.

When the types of trucks used heretofore are placed in a cylinder vulcanizer there is considerable waste space between the sides of the trucks and the cylindrical walls of the vulcanizing chamber. Furthermore it has been the practice heretofore to connect a number of trucks by suction pipes and then move the trucks as a unit into the vulcanizer after which they are connected to a vacuum system outside of the vulcanizing receptacle, or to connect the trucks separately to the vacuum system after they are pushed into the vulcanizer.

Having in mind the foregoing one important feature of the present invention resides in an improved type of vulcanizing frame for supporting the articles to be vulcanized, such frame preferably being circular so that its diameter need be only slightly less than that of the interior of the cylindrical vulcanizing chamber. A rounded or circular frame such as herein contemplated also will accommodate very satisfactorily different loading arrangements.

Another feature of the present invention resides in an article supporting frame which in addition to being circular in shape is of relatively narrow width so that the persons engaged in placing article supporting forms on the nipples of the different racks need reach inwardly from either side of the frame only about one foot to reach the innermost nipples. This makes the present vulcanizing frame easy to load and unload and lessens the likelihood of the unvulcanized shoes being damaged as they are placed upon the vulcanizing racks.

Another feature of the present invention resides in a circular vulcanizing frame provided with a form supporting rack that is made up of an upright central pipe or riser and a number of lateral manifolds extending as limbs from the opposite sides of the pipe. The manifolds serve to support a large number of vulcanizing forms upon opposite sides of the central plane of the supporting rack and operable to exhaust air from the forms as long as air is exhausted from the the central pipe.

Another feature of the present invention resides in means whereby the vacuum system of one vulcanizing frame may be easily and quickly connected to the vacuum system of another vulcanizing frame by simply pushing one frame against another when they are assembled inside of the vulcanizing chamber. This is accomplished by providing the main central pipe of each portable frame with suction pipes extending from the opposite sides of this pipe towards the outer dimension of the frame, and by equipping the outer end of each of these suction pipes with a yielding ring or gasket so that a vacuum connection will be formed automatically between adjacent frames when they are moved together.

Another feature of the present invention resides in the construction whereby the article supporting manifolds that are secured to the upright central pipes are arranged so that they extend downwardly at an acute angle to the upright pipe, to thereby support forms for footwear in nested relations one to the other to increase the number of forms that a frame will accommodate.

Another feature of the present invention resides in the construction wherein the upright central pipe has a large number of pipe nipples disposed along the opposite sides of such pipe so that the number of manifolds secured to such central pipe may be increased or decreased to vary the space between adjacent manifolds, depending upon the amount of space required by the forms to be carried by such manifolds.

Another feature of the present invention resides in the construction whereby the outer ends of the article supporting manifolds may be removably secured to the main frame so as to retain these adjustable manifolds rigidly in place.

Another feature of the present invention resides in an overhead carriage and monorail adapted to support the present vulcanizing frame so that it can be readily moved from one place to another, and also in means whereby such frame is rotatably secured to its supporting carriage in order that it may be turned to a position longitudinally of the carriage when it is used in a narrow aisle between working tables, or anywhere in the factory where this will save floor space, and it also enables the frame to be turned transversely to such carriage for movement into the vulcanizing chamber.

The above and other features of the present invention will be more fully understood from the following description when read in connection with the accompanying drawings wherein:

Fig. 1 is a longitudinal sectional view through a cylindrical vulcanizing receptacle having therein four vulcanizing frames constructed in accordance with the present invention, two of the circular frames being partly broken away.

Fig. 2 is a sectional view taken on the line 2—2 of Fig. 1.

Fig. 3 on a smaller scale is a plan view showing one article carrying frame near the vulcanizing receptacle and another frame between two make-up tables.

Fig. 4 is a sectional view through a form supporting manifold showing a hollow limb, and branches extending at right angles to the limb.

Fig. 5 is a vertical view of guiding flanges attached to the floor and a roller at the lower end of the vulcanizing frame.

Fig. 6 is a vertical sectional view through a monorail carriage and associated parts.

Fig. 7 is a sectional view of a vacuum coupling having two yielding gasket rings and also shows one of these rings dotted in an inactive position; and Fig. 8 is a longitudinal sectional view through a hollow shoe form of well known construction.

The vulcanizing receptacle may be constructed as heretofore and as shown comprises a large cylindrical receptacle 10 which is permanently closed at one end as indicated by 11 and at the other end is provided a door 12 mounted upon the hinges 13 and adapted to be closed as shown in Fig. 1 and opened as shown in Fig. 3. A gasket 14 is provided to form a tight joint between the door and receptacle when the door is closed. The interior of the vulcanizing receptacle may be heated by heating the air therein or by filling the chamber with steam as heretofore. The entire vulcanizing receptacle should be made of heavy metal and the door should be strongly sealed when closed so as to confine steam therein under pressure.

The vulcanizing frame contemplated by the present invention preferably has a short axial length and a substantially circular contour to conform to the rounded interior of the vulcanizing chamber and it is designed to extend transversely of the vulcanizing receptacle. It may therefore be described as a hollow relatively flat or planar frame. In the construction shown each vulcanizing frame comprises a metal ring formed of the T-shaped irons 15, and this ring is flattened at its top as at 16 and at its bottom as at 17. Within this frame there is provided the upright central pipe or riser 18 which is closed at its lower end by the cap 19 having spaced downwardly extending lugs that are bolted to the T-shaped bar 17. The pipe 18 is provided at its upper end with the union 20 which secures the T-connection 21 to the upper end of the pipe 18, and this T-connection is rigidly secured to a recessed portion of the bar 16.

The upright central pipe 18 is provided with opposite rows of nipples 22 disposed in the plane of the ring 15, there being eight of these nipples extending from each side of the pipe 18, and it should be noted that these nipples incline downwardly so that they form an acute angle to the vertical pipe 18. The object in providing this relatively large number of nipples at each side of the pipe 18 is to permit the manifolds upon which the vulcanizing forms 24 and 25 are mounted to be spaced different distances apart. This will be apparent from an examination of Fig. 2 in which the two manifolds at the upper part of the frame are disposed closer together at the left hand side where they support the shoe forms 24 than they are at the right hand side where they support the boot forms 25. The nipples 22 which are not used are closed with plugs 26.

Each manifold is conveniently formed of a pipe 23 which is provided at one end with the threaded rotating ring 27 by means of which it can be removably secured to a nipple 22. These pipes 23 which extend in the form of limbs from the opposite sides of the vertical pipe 18 are provided with the transverse hollow branches 28 that extend through the pipe 23 as shown in Fig. 4. The branches 28 should be welded to the pipe 23 where they pass through holes therein and should be provided with holes 29 within the pipe 23 that form communications between the interior of the pipes 23 and 28. The cross branches 28 are provided with the upwardly extending nipples 30 each of which has a collar that surrounds the pipe and is welded thereto. Each branch in the construction shown has four nipples, and the outer ends of the branches 28 are closed with the plugs 31. In order to increase the rigidity of the manifolds formed of the limbs 23 and transverse branches 28, means is provided whereby the outer ends of the pipes 23 may be bolted to the T-shaped bars 15 or to the upright braces 32 by the bolts 33.

The vulcanizing frame of the present invention is designed so that it may be easily loaded and unloaded, and to this end the branches 28 are made relatively short so that the operators loading the frame or unloading the frame will not need to reach inwardly more than a short distance into the interior of the frame to reach the innermost nipples 30. It has been found preferable in practice when shoe forms such as 24 and 25 are used to arrange the work supporting manifolds comprising the pipes 23 and 28 so that they slope downwardly at an angle of approximately 29 degrees to the horizontal plane. This arrangement permits the assembly of the greatest possible number of forms 24 or 25 in nested relation with each other without protruding beyond the outer periphery of the ring 15. If other types of shoe forms are used a different angle may be desirable, and in vulcanizing gloves these branches may be horizontal.

The vulcanizing frame as shown and described is relatively thin compared with its large diameter. This construction permits the frame to be easily loaded and unloaded and moved along a relatively narrow aisle, and also allows room for the workers to stand between this frame and the tables 34 shown in Fig. 3 for convenience in loading or unloading the vulcanizing frame. The narrow width of such frames also permits a relatively large number of the frames to be assembled in the vulcanizing chamber as will be apparent from Fig. 1 where four of these vulcanizing frames are shown as placed within a relatively short vulcanizing chamber.

These portable vulcanizing frames are so designed that forms carrying shoes, boots, gloves or other articles made of rubber or rubber-like material may be easily loaded thereon adjacent the make-up tables 34 and then moved along a runway into and out of the vulcanizing receptacle.

To this end in accordance with a preferred embodiment of the present invention each vulcanizing frame is suspended from a monorail comprising the overhead rail 35 along which the carriage 36 travels. Each carriage 36 has two slightly spaced flanged wheels 37 at one end and two similar wheels 37 at the other end, these wheels receive the supporting rail 35 between them as shown in Fig. 2. The upper portion 16 of the vulcanizing frame is pivotally secured to the carriage 36 as best shown in Fig. 6. To this end there is secured to the rail 16 a disc 38 having projecting upwardly therefrom the frame supporting bolt 39 that passes upwardly through a central hole in the carriage 36 and is rotatably secured to the carriage by the nut 40. A packing ring 41 is preferably provided below the nut 40. The purpose in pivotally suspending the vulcanizing frame from the carriage 36 is to permit the frame to be rotated relatively to the carriage so that it may extend longitudinally of or transversely of the carriage as will be apparent from Fig. 3. It is desirable to lock the frame to the carriage 36 in different positions of angular adjustment, therefore the carriage 36 is preferably provided with four pin receiving sockets disposed concentric with the bolt 39 at ninety degrees apart to receive the locking pin 42 slidably mounted upon the portion 16 of the vulcanizing frame. This pin 42 may be moved into and out of its locking position by manually shifting a rocking lever 43 pivoted to the rail 16 at 44.

The vulcanizing forms 24 and 25 are preferably made hollow as shown in Fig. 8 and have a number of small holes 45 provided in the sole and heel portion of the form so that a suction produced within the hollow form will act through these holes 45 to exhaust air from the interior of the footwear and cause it to conform closely to the form during the vulcanizing period. Each form preferably has a tapered hole 46 therein so that the form may be mounted upon a tapered nipple 30 to thereby support the form and exhaust air therefrom when air is evacuated from the main pipe 18 and the manifolds extending therefrom.

An extremely important feature of the present invention resides in the construction whereby one vulcanizing frame may be quickly and easily connected to another and to a vacuum pipe so as to exhaust air from such frames during the vulcanizing period. This is accomplished in the construction shown by providing the T-connection 21 which is mounted at the upper end of the pipe 18 with the laterally extending pipes 47, and each of these pipes has attached to its outer end a ring 48 having a recess in which is mounted an annular yielding gasket 49. The arrangement is such that when one frame is moved against another the aligned gaskets of the two frames will be forced one against the other as best shown in Fig. 7 in full lines. When a yielding gasket 49 is not in contact with another gasket it will appear as shown in dotted lines in Fig. 7.

By constructing the form supporting frames as shown and described, so that all of the form supporting manifolds of a frame are connected to the central upright pipe 18 having the oppositely extending exhaust pipes 47 and annular gaskets 49, the entire vacuum system for exhausting air from the form supporting frames in a vulcanizing receptacle may be easily connected up. This may be done by pushing the first vulcanizing frame into the cylindrical vulcanizer until its gasket 49 abuts against the gasket 50 that is carried by the vacuum pipe 51 that protrudes inwardly through the rear wall 11 of the vulcanizing receptacle. This pipe 51 is connected outside of the vulcanizing receptacle to a vacuum pipe 52 having the hand valve 53 and the pipe 52 is connected to vacuum producing means not shown. One vulcanizing frame after another, or the entire group of frames, are pushed into the vulcanizer so that one abuts against the other inside of the vulcanizer to thereby cause the adjacent exhaust pipes 47 to be connected as shown in Fig. 1. When all of the vulcanizing frames are in place the door 12 may be closed and tightly sealed in place, but the vulcanizing frames should be held one pushed against the other to maintain an air-tight joint between the connecting gaskets 49. The frames may be held one against the other by providing upon the inside of the door 12 in alignment with the pipes 47 a yielding ram adapted to press firmly against and seal the gasket 49 that is close to the door 12. Such a ram may comprise a sleeve 54 secured to the inner face of the door 12 and having slidably mounted therein the plunger 55 which carries at its outer end the rubber disk 56 adapted to abut against and close the gasket 49. A strong coiled spring 57 serves to hold the vulcanizing frames pushed one against the other when the door 12 is closed.

Each vulcanizing frame is preferably provided near its lower end with a bumper guard 58 which is attached to the main supporting ring 15, and when the first frame is pushed into the vulcanizing receptacle its bumper guard will abut against the stop 59 secured to the rear wall 11. As other frames are pushed into the vulcanizer one guard 58 may strike momentarily against another, but when the door 12 is closed and the yielding ram head 56 is pressing against the row of aligned pipes 47, the bumpers 58 should be out of contact with each other as shown in Fig. 1.

After the vulcanizing frames are assembled within the vulcanizer and the door 12 is sealed closed the valve 53 may be open to exhaust air from the vulcanizing forms 24 and 25 carried by the different frames. The vulcanizing receptacle may be heated with steam or hot air as heretofore. If a very long vulcanizing receptacle is used it may be desirable to provide vacuum connections through the door 12 as well as through the rear wall 11.

Since the overhead rail 35 upon which the carriage 36 travels extends into the vulcanizing receptacle as shown, it is necessary to provide this rail with a removable section near the door 12 so that this section can be moved out of the way when the door is closed. As the entire vulcanizing frame is suspended from an overhead carriage 36 the frame may tend to swing in an objectionable manner near the tables 34 when it is being loaded or unloaded. To prevent these frames from swinging the rail 17 of each frame preferably has secured to its lower face a rotating caster 60 adapted to travel in a slot formed by securing the angle irons 61 to the floor 62 in slightly spaced relation to each other as shown in Fig. 5. Similar guiding irons 61 for the casters 60 are preferably provided in the vulcanizer, as will be apparent from Fig. 1 in which one of these irons appears in this vertical sectional view.

The vulcanizing frames contemplated by the present invention may be easily loaded adjacent the work tables where the shoes or other articles are built upon the vulcanizing forms, whereupon the frames are pushed along the monorail into the vulcanizing chamber to vulcanize or heat treat such articles.

Having thus described my invention, what I claim and desire to protect by Letters Patent is:

1. A portable substantially flat rack structure for supporting a large number of elongated rubber articles in a cylindrical shaped vulcanizing receptacle and adapted to extend transversely therein, comprising a hollow planar frame the height of which exceeds several times its axial length, means for suspending this frame in a vertical position, a single central pipe mounted in the frame to extend from the top to the bottom thereof, auxiliary pipes extending as limbs from the opposite sides of the central pipe in the plane of the planar frame, nipples along said central pipe to receive the auxiliary pipes, cross branch pipes extending from the opposite sides of said limbs at right angles to said plane, and hollow projections upon these cross branch pipes adapted to support the articles upon the opposite sides of said plane and to exhaust air from the articles when air is exhausted from said central pipe.

2. A portable substantially flat rack structure for supporting a large number of elongated rubber articles in a cylindrical shaped vulcanizing receptacle and adapted to extend transversely therein, comprising a hollow planar frame the height of which exceeds several times its axial length, a traveling carriage having the frame suspended therefrom in a vertical position, a single central pipe mounted in the frame to extend from the top to the bottom thereof, auxiliary pipes extending as limbs from the opposite sides of the central pipe in the plane of the planar frame, cross branch pipes extending from the opposite sides of said limbs at right angles to said plane, and hollow projections upon these cross branch pipes adapted to support the articles upon the opposite sides of said plane and to exhaust air from the articles when air is exhausted from said central pipe.

3. A portable substantially flat rack structure for supporting a large number of elongated rubber articles in a cylindrical shaped vulcanizing receptacle and adapted to extend transversely therein, comprising a hollow planar frame the height of which exceeds several times its axial length, means for supporting this frame in an upright position, a single central pipe mounted in the frame to extend from the top to the bottom thereof, auxiliary pipes extending as limbs from the opposite sides of the central pipe in the plane of the planar frame, cross branch pipes extending from the opposite sides of said limbs at right angles to said plane, and hollow projections upon these cross branch pipes adapted to support the articles upon the opposite sides of said plane and to exhaust air from the articles when air is exhausted from said central pipe.

4. A portable substantially flat rack structure for supporting a large number of elongated rubber articles in a cylindrical shaped vulcanizing receptacle and adapted to extend transversely therein, comprising a hollow planar frame having curved outer walls that approximate the curve of the vulcanizer walls and the height of which frame exceeds several times its axial length, means for supporting this frame in an upright position, a single central pipe mounted in the frame to extend from the top to the bottom thereof, auxiliary pipes extending as limbs from the opposite sides of the central pipe in the plane of the planar frame, cross branch pipes extending from the opposite sides of said limbs at right angles to said plane, and hollow projections upon these cross branch pipes adapted to support the articles upon the opposite sides of said plane and to exhaust air from the articles when air is exhausted from said central pipe.

5. A portable substantially flat rack structure for supporting a large number of elongated rubber articles in a cylindrical shaped vulcanizing receptacle and adapted to extend transversely therein, comprising a hollow planar frame the height of which exceeds several times its axial length, an over head carriage for the frame, means for rotatably suspending the frame from the carriage so that it may be rotated relatively to the carriage and locked in different rotated positions, a single central pipe mounted in the frame to extend from the top to the bottom thereof, auxiliary pipes extending as limbs from the opposite sides of the central pipe in the plane of the planar frame, cross branch pipes extending from the opposite sides of said limbs at right angles to said plane, and hollow projections upon these cross branch pipes adapted to support the articles upon the opposite sides of said plane and to exhaust air from the articles when air is exhausted from said central pipe.

6. A portable substantiallly flat rack structure for supporting footwear in a vulcanizing receptacle and adapted to extend transversely therein, comprising a hollow planar frame the height of which exceeds several times its axial length, means for supporting this frame in an upright position, a single central pipe mounted in the frame to extend from the top to the bottom thereof, auxiliary pipes extending as limbs from the opposite sides of the central pipe in the plane of the planar frame, cross branch pipes extending from the opposite sides of said limbs at right angles to said plane, and hollow projections upon these cross branch pipes adapted to support the footwear upon the opposite sides of said plane and to exhaust air from the footwear when air is exhausted from said central pipe.

SAMUEL S. MINER.

REFERENCES CITED

The following references are of record in the file of this patent:

UNITED STATES PATENTS

| Number | Name | Date |
| --- | --- | --- |
| 685,287 | Mende | Oct. 29, 1901 |
| 1,295,595 | Price | Feb. 25, 1919 |
| 1,668,032 | Wilhelmi | May 1, 1928 |
| 1,668,037 | Abbott, Jr. | May 1, 1928 |
| 1,871,608 | Hallinan | Aug. 16, 1932 |
| 2,032,508 | Seiberling et al. | Mar. 3, 1936 |
| 2,209,764 | Rutherford | Dec. 26, 1916 |